US 9,984,545 B2

(12) United States Patent
Meganathan

(10) Patent No.: US 9,984,545 B2
(45) Date of Patent: *May 29, 2018

(54) SYSTEM AND METHOD OF MONITORING THE VIDEO SURVEILLANCE ACTIVITIES

(71) Applicant: Honeywell International Inc., Morristown, NJ (US)

(72) Inventor: Deepak Sundar Meganathan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/940,456

(22) Filed: Nov. 13, 2015

(65) Prior Publication Data

US 2016/0086464 A1 Mar. 24, 2016

Related U.S. Application Data

(63) Continuation of application No. 13/772,128, filed on Feb. 20, 2013, now Pat. No. 9,218,729.

(51) Int. Cl.
*G08B 13/196* (2006.01)
*G06F 3/0481* (2013.01)
(Continued)

(52) U.S. Cl.
CPC ..... *G08B 13/19682* (2013.01); *G06F 3/0482* (2013.01); *G06F 3/04817* (2013.01);
(Continued)

(58) Field of Classification Search
CPC . H04N 7/16; H04N 7/18; H04N 5/445; G06F 3/00; G06F 17/00; G07B 15/02
See application file for complete search history.

(56) References Cited

U.S. PATENT DOCUMENTS 5,635,693 A 6/1997 Benson et al.
2005/0132414 A1 6/2005 Bentley et al.
(Continued)

FOREIGN PATENT DOCUMENTS

CN 102801957 A 11/2012
CN 102929592 A 2/2013

OTHER PUBLICATIONS

European Search Report corresponding to Application No. EP 14 15 3356, dated Jul. 22, 2014.
(Continued)

*Primary Examiner* — Sathyanaraya V Perungavoor
*Assistant Examiner* — Patricia I Young
(74) *Attorney, Agent, or Firm* — Husch Blackwell LLP

(57) ABSTRACT

A method and apparatus are provided, wherein the method includes the steps of an activity analysis processor monitoring activities of a security system protecting a secured area and a human operator of the security system and evaluating the activities, the activity analysis processor detecting an event and saving a summary of the event to a cloud server, a user interface of the cloud server detecting a request from a user for an activity report, the cloud server downloading the activity report to the user, the activity report including playback features controlling playback of the summary, the playback features including a provision to accept requests from the user for additional data, and the playback features downloading and displaying the additional data in response to the requests from the user for the additional data.

17 Claims, 3 Drawing Sheets

(51) Int. Cl.
*G06F 3/0484* (2013.01)
*H04N 7/18* (2006.01)
*G07C 1/00* (2006.01)
*G06F 3/0482* (2013.01)
*G06F 3/14* (2006.01)
*G08B 19/00* (2006.01)
*G08B 25/14* (2006.01)
*G07C 3/00* (2006.01)

(52) U.S. Cl.
CPC ............ *G06F 3/04842* (2013.01); *G06F 3/14* (2013.01); *G07C 1/00* (2013.01); *G08B 13/19665* (2013.01); *G08B 13/19671* (2013.01); *H04N 7/188* (2013.01); *G06F 2203/04803* (2013.01); *G07C 3/00* (2013.01); *G08B 13/19695* (2013.01); *G08B 19/00* (2013.01); *G08B 25/14* (2013.01)

(56) References Cited

U.S. PATENT DOCUMENTS

2007/0033632 A1 2/2007 Baynger et al.
2010/0033566 A1 2/2010 Drive et al.
2012/0300081 A1 11/2012 Kim

OTHER PUBLICATIONS

First Office Action and Search Report for corresponding CN patent application 201410056056.9, dated Jan. 4, 2018.
English-language translation of First Office Action and Search Report for corresponding CN patent application 201410056056.9, dated Jan. 4, 2018.
English-language translation of abstract for CN patent application 102801957, dated Nov. 28, 202.
English-language translation of abstract for CN patent application 102929592, dated Feb. 13, 2013.

FIG. 2

SYSTEM AND METHOD OF MONITORING THE VIDEO SURVEILLANCE ACTIVITIES

CROSS-REFERENCE TO RELATED APPLICATIONS

This application is a continuation of and claims the benefit of the filing date of U.S. application Ser. No. 13/772,128 filed Feb. 20, 2013.

FIELD

The field is related to security systems and, more particularly, to methods for monitoring activities within security systems.

BACKGROUND

Security systems are generally known. Such systems typically include a number of sensors that detect intruders or other unauthorized persons within a secured area. One or more closed circuit television (CCTV) cameras may also be used to detect intruders or other signs of trouble.

The CCTV cameras may be coupled to a display monitored by a security guard. The guard may be local, or the guard may monitor the cameras from a remote location.

The secured area may be limited to a relatively small area (e.g., a home) with relatively few occupants or cover a relatively large area (e.g., an airport) that has many occupants.

In the case of large areas, such as an airport, the number of cameras may be large (e.g., numbering in the hundreds). Where the number of cameras is large, a switching mechanism may be used to display an image from one of the cameras to the guard before switching to another camera.

While existing security systems for large areas work well, they are difficult to supervise. This is necessarily the case because each security event detected with a security system is potentially different than any other event and, in most cases, is not related to any other event. Because of the difficulty of supervising security systems, a need exists for better methods of correlating events within such systems.

BRIEF DESCRIPTION OF THE DRAWINGS

FIG. 2 depicts a first example of an activity report displayed to a user.

DETAILED DESCRIPTION OF AN ILLUSTRATED EMBODIMENT

Figure 1:
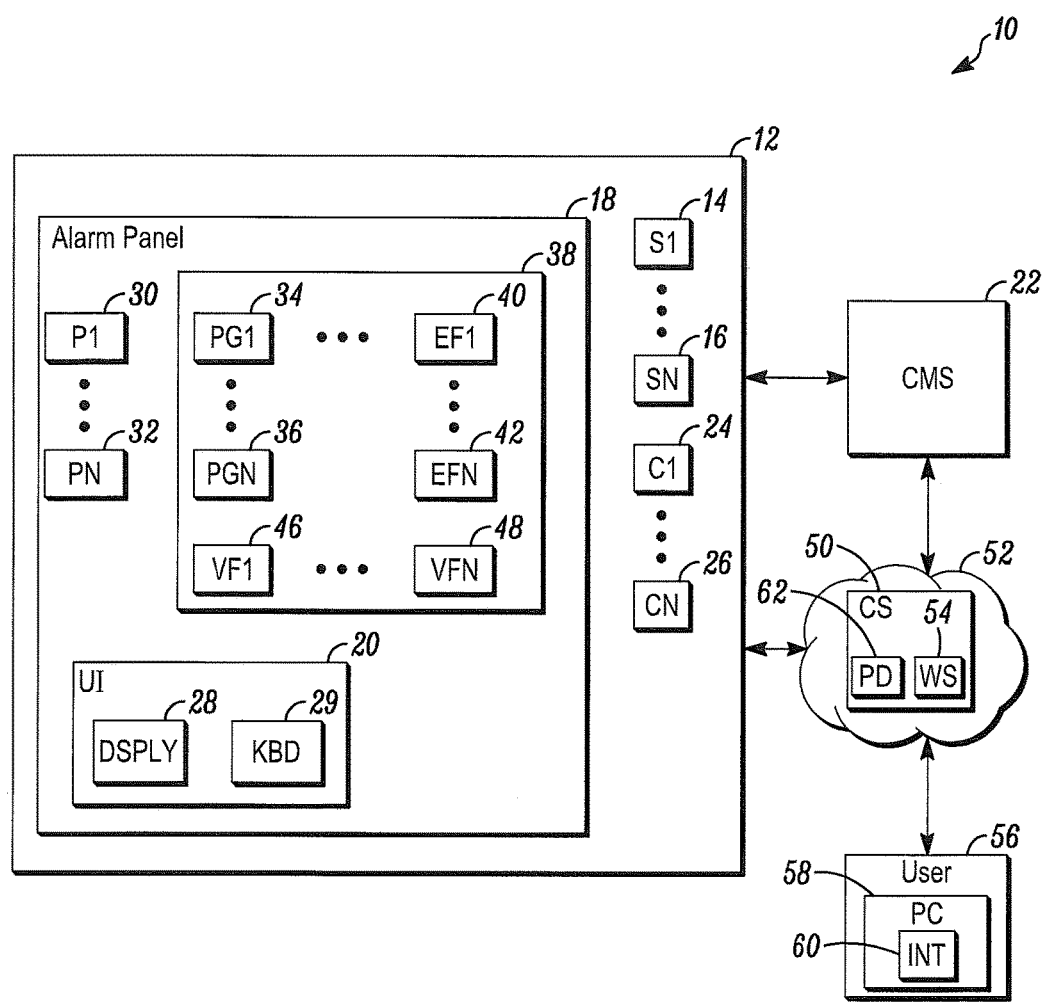
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a block diagram of a security system 10 shown generally in accordance with an illustrated embodiment. Included within the security system 10 are a number of sensors 14, 16 used to detect events within a secured area 12. The sensors may be switch attached to one or more portals (e.g., doors, windows, etc.) providing entrance into and egress from the secured area. Alternatively, the sensors may be environmental detectors (e.g., smoke detectors) or motion detectors.

The sensors may be coupled to an alarm system control panel 18. Upon detection of activation of one of the sensors, the panel may couple an alert or other alarm message to a user interface 20. Additionally or alternatively, the panel 18 may couple an alarm message to a central monitoring station 22.

Also included within the secured area may be one or more cameras 24, 26. Video from the cameras may be shown on a display 28 of the user interface 20. A human operator may use a keyboard or touchscreen 29 of the user interface 20 to select one of the cameras 24, 26 as a source of video to be shown on the display 28 or to acknowledge alarms originating from one of the sensors.

Included within the panel 18 may be one or more processing apparatuses (processors) 30, 32 operating under control of one or more computer programs 34, 36 loaded from a non-transient computer readable medium (memory or system database) 38. As used herein, reference to a step performed by a computer program is also a reference to the processor executing that step.

During operation of the system 10, an alarm processor may monitor each of the sensors for the events (e.g., intruder, fire, etc.) associated with the secured area. Upon detecting one of the events, the alarm processor may activate one of the cameras with a field of view that includes an activated one of the sensors.

The alarm processor (or a separate event processor) may save a summary of the events into an event file 40, 42. Each of the events may include an identifier of one of the sensors that detected that event and a time of activation of that sensor. In the event that one of the cameras was activated in response to one of the events, the event file may also include a video clip of that event.

Other processors may monitor the cameras. For example, a motion detection processor may process video frames to detect the events, such as motion, within the secured area. Upon detecting the motion, an alert may be sent to the user interface 20. The motion detection processor may also save an indicator of detection of motion as an event incident within the event file. A video clip of the detected motion may also be saved within the event file.

A video signal processor may also monitor the cameras for proper operation. In the event of loss of signal from one of the cameras, the video signal processor may generate a warning event message and save a record of that event in the event file.

A video recording processor may also save video into one or more video files 46, 48 continuously or only when one of the events associated with one of the cameras is detected. A file processor may monitor saving the video into the video files in order to detect malfunctions of the cameras or of an associated apparatus that saves the video into the video files.

In this regard, the malfunctions may be saved as warning events. In contrast, the malfunctions that relate to a manner of storing the video may be saved as recommendations that allow a supervisor to assess a need for remedial actions.

The user interface 20 may be located on the panel 18 or may be a separate terminal used by a security guard. At the beginning of a work shift, the security guard may sign into the system by entering a personal identifier (ID) through the keyboard 30. Each time the guard signs in, a terminal processor may save the sign-in as one of the events within the event file.

The terminal processor may also monitor operator activity in conjunction with the events. In this regard, each time the human operator acknowledges an alert of one of the events, the terminal processor may also save an identifier of the human operator within the event file.

In addition to saving the identifier of the human operator, the terminal processor may also track and store a record of actions taken by the human operator in response to one of the events. For example, if the human operator activates one of the cameras in response to that event, then a record of the response, including an identifier of that camera and a time of activation, may also be saved in the event file.

In addition to saving operator actions, the terminal processor may also save messages intended for a security system supervisor. In this regard, the human operator may activate a message icon on his/her screen and type a message to the supervisor (e.g., asking for help in investigating one of the events). The terminal processor may save the message as a help request in the event file.

The system 10 may also include a statistics processor that generates and saves deviation, trend, pattern, and criticality information related to activities. The statistics processor may monitor a terminal used by the human operator for activity or simply review data previously saved within the event file. For example, the statistics processor may collect a number of alarm messages per time period and save the number of alarm messages per time period as one of the events within the event file. The statistics processor may also retain statistics over a longer period, detect deviations from a long term average, and save indications of such deviations within the event file.

The statistics processor may also have access to a list of critical functions and activities. This list may be based upon single events or combinations of events. For example, one of the critical functions may be a need for the human operator to respond to an alarm alert within a predetermined period of time. In the case of a fire alert, this need would be based upon a need to prevent a spread of a fire. Alternatively, in the case of an intruder, a quick response by the human operator may allow the human operator to capture video images of the intruder. In each case, the statistics processor may determine a response time based upon criticality and an average response time. Such data may also be stored as data within the event file.

The system 10 also includes an activities analysis processor that detects changes to the event file within the system database 38. The changes may be in the form of critical events or alarms, system and/or operator activities that deviate from a historical norm or a norm of other operators, system and/or operator activities that form certain patterns, or system and/or operator activities that generate or appear to form some new trend. The activities analysis processor may collect this information from the event file in real time and upload real time summaries of the collected information to one or more programmed processors 30, 32 of a cloud server 50 that is accessed through the Internet 52. The summaries are, in turn, saved as posts in a post database 62.

The posts to the database 62 may be in the form of video, video clips, image(s), text, audio, charts, and graphs. Each of the posts, in turn, may have a searchable title, such as data, actions, warnings, help requests, and recommendations. The posts are stored in the post database 62 for retrieval by a user through a portable device 56.

Once uploaded to the cloud server 50, the user may access a website 54 of the cloud server 50 and download the summaries through the portable device 56. A programmed processor 30, 32 within the portable device may present the summaries to the user through a display of the portable device 56. For example, the display may automatically show a list of currently active alarms within the system 10. Critical alarms may be highlighted, or the critical alarms may be shown as a separate list. One or more entries on the list may have a video clip attached.

Included within the summaries downloaded to the portable device 56 may be a playback control 58. The playback control 58 may be a Java script or other computer program 34, 36 that executes on the programmed processor of the portable device 56 and that controls playback (e.g., scrolling) of items within the summaries. In this regard, the summaries may include a report of most recent activities reported within a real time timeline window. In this regard, the summaries may include a list of the events within the timeline window, an identifier of human operators who responded to the events, and statistics for a relevant time period. The playback control 58 allows the user to scroll through the list, select certain items for viewing additional detail, and play back any video clips attached to the selected items.

Alternatively, the playback control 58 may allow the user to select specific types of information by title (e.g., data, actions, warnings, help requests, recommendations, etc.). Upon selection of one title, a timeline window of data related to that title may be displayed.

The playback control 58 may further include an interface 60 that presents a menu and accepts requests for additional data from the user. In this regard, the additional data may be related to a selected item from the summaries, or the menu may allow access to global features.

The playback control downloads and displays the additional data to the user in response to the requests. For example, the menu may have titles, such as alarms, data, actions, warnings, help requests, and recommendations. Selection of one title from the menu may cause the playback control 58 to download and present to the user the summaries of data related to that title.

The timeline window of the summaries may be set by the user of the portable device 56 to any appropriate time period (e.g., one hour, one day, etc.) through the interface 60 of the playback control. The user may also set a time period including start and stop times for data. However, once set for a predetermined rolling time period, the portable device 56 may receive real time data that is displayed on the portable device 56 substantially instantaneously after being reported within the system 10 with the most recent data displayed first.

In another regard, the interface 60 provided through the playback control may provide a search function. Using the search function, the user may specify a search parameter for displaying data from the post database 62. For example, the user may use an identifier of the human operator as a search term. In response, a search processor of the server 50 may search for any of the events associated with the identified human operator. The search processor may also display the events handled by the identified human operator, actions taken by the identified human operator in response to the events, and/or statistics of the identified human operator (e.g., time to respond to alerts, types of responses to alerts, etc.). The search processor may also display any deviations of the identified human operator in handling the alerts when compared to statistics of other operators.

Alternatively, the user may specify a type of alarm (or event) or alarms (or events) from specific sensors. In response, the playback control may retrieve similar events handled by the same or different operators.

The playback control 58 may also have a message interface that allows the user of the portable device 56 to communicate with the human operator on duty at a terminal 20. The user of the portable device 56 may send short messages to the human operator at the terminal inquiring about system status, alarm detail, or certain alarms shown on the display of the portable device 56. The human operator on duty at the terminal 20 may respond with a message providing an explanation.

Figure 2:
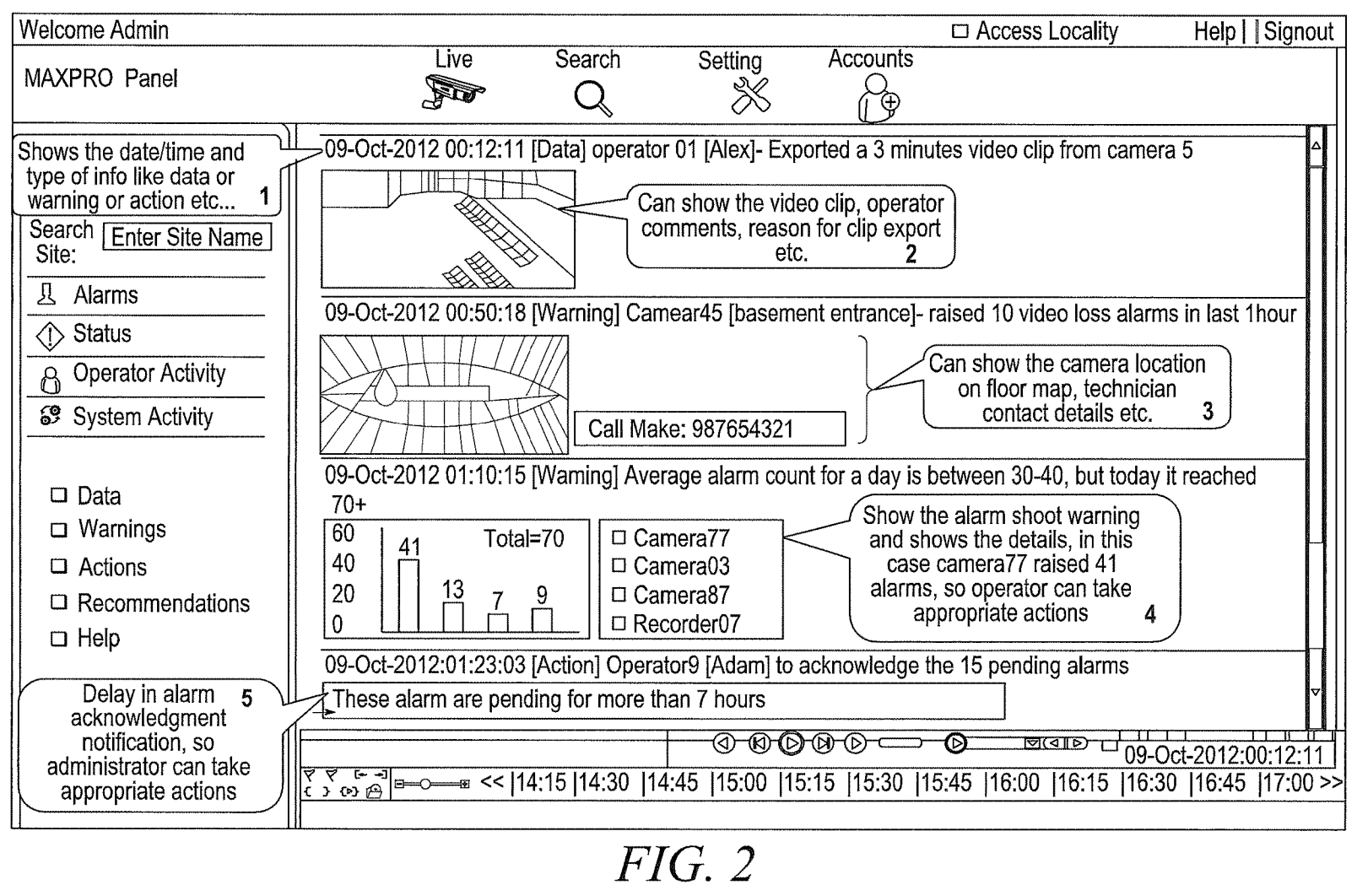

FIG. 2 provides a first example of a report delivered to a user. For example, FIG. 1 shows a screen including a first summary with a first portion that shows (1) data including a time, a date, and an operator's name. The first summary also indicates that a 3-minute video clip is attached. A sub-window or portion in the first summary shows (2) a first frame of the clip.

A second summary of the screen in FIG. 2 includes a first portion that shows a time, a date, and a warning. In this case, the warning shows (3) that a particular camera has had an inordinate number of video loss indications within a predetermined time period. The second summary also shows a map of a location of the camera as well as technical details of who to call to service the camera.

A third summary of the screen in FIG. 2 shows (4) a summary of alarm events. In this case, the third summary indicates sources of the alarm events.

A fourth summary of the screen in FIG. 2 shows delayed alarms. In this case, the fourth summary shows (5) alarms that have not been acknowledged or acted upon by an operator. The user may click on the forth summary to see a list of the alarms in this category.

Figure 3:
FIG. 3 depicts a second example of an activity report displayed to a user.

FIG. 3 provides a second example of a report delivered to a user. For example, an upper-most window shows an event report delivered to the user of the system 10. The upper-most window also shows a recommendation window that may be generated by a parameter monitoring processor and displayed to the user in the case where a camera consumes an inordinate amount of resources available within the system. In this case, the parameter monitoring processor displays a configuration page of the camera (e.g., camera 19). The configuration page may depict a current list of settings of the camera so that the user can recheck the settings of the camera (e.g., resolution, GOP, bit rate settings, etc.) as shown in information box 1.

The second window shown in FIG. 3 depicts an event window that may also be displayed to the user. In this case, an image processor of the system may detect some event within a first set of images (e.g., motion) and display that event to the user. The displayed event may include a notification of a type of the event (e.g., notice of detection of motion) and a video frame in which the type of the event was detected. In this case, the user may identify a second set of images associated with the event (e.g., a video clip that incorporates an event frame), attach that clip to an event notification, and export that notification to a cloud server. In addition, the user, a supervisor, or other operators can add comments (as an attached text box) to that notification.

In a third window shown in FIG. 3, an event window is shown that may be displayed to the user and exported to the cloud server. For example, a parameter processor may detect an inordinate number of events from a sensor (e.g., motion events detected by a particular camera within a predetermined time period). In response, the parameter processor may generate a recommendation (and event) that identifies a trigger of the generated event (e.g., too many alarms from the particular camera during the predetermined time period) and an information page for the sensor (e.g., a configuration page for the sensor and/or other sensors, the number of events for all sensors, etc.). In this case, a recommendation event page shows all alarm details associated with the generated event, a snapshot of the alarms, a video clip, and a camera configuration page. A notification page is displayed so that the user and/or an administrator can review the same and take some particular action, such as reducing a priority of the generated event or disabling the generated event (or changing a threshold) for some time period in order to avoid flooding the system with notifications of events.

In general, the system 10 may provide a convenient method for reporting data to a supervisor. The method may include the steps of an activity analysis processor monitoring activities of a security system protecting a secured area and a human operator of the security system and evaluating the monitored activities within a security system database based upon a deviation, trend, pattern, and criticality of the monitored activities, the activity analysis processor detecting an event within the monitored activities and saving a summary of the event to a cloud server, the summary including one or more of video, image, text, audio, charts, and graphs relating to protection of the secured area, a user interface of the cloud server detecting a request from a user for a report of the monitored activities reported within a real time timeline window, the report of the monitored activites including at least a content of the summary of the event associated with the secured area, the report of the monitored activities further containing one or more of data, actions, warnings, help requests and recommendations generated by the activity analysis processor, the cloud server updating an internal database of the cloud server in real time based upon posts from the activity analysis processor or the human operator, the cloud server downloading the report of the monitored activities to the user, the report of the monitored activities displayed to the user including playback features controlling playback of the summary, the playback features further including a provision to accept requests for additional data from the user, and the playback features downloading and displaying the additional data in response to the requests.

Alternatively, the system may be defined by an apparatus. The apparatus may include a cloud server, an activity analysis processor that monitors activities of a security system protecting a secured area and of a human operator of the security system, that evaluates the monitored activities within a security system database based upon a deviation, trend, pattern and criticality of the monitored activities, that detects an event within the monitored activities, and that saves a summary of the event to the cloud server, wherein the summary includes one or more of video, image, text, audio, charts, and graphs relating to protection of the secured area, a user interface of the cloud server that detects a request from a user for a report of the monitored activities reported within a real time timeline window, wherein the report of the monitored activities includes at least a content of the summary of the event associated with the secured area and one or more of data, actions, warnings, help requests, and recommendations generated by the activity analysis processor, and wherein the cloud server updates an internal database of the cloud server in real time based upon posts from the activity analysis processor or the human operator, and an interface processor of the cloud server that downloads the report of the monitored activities to the user, wherein the report of the monitored activities displayed to the user further comprises a playback control executing on a processor of a user device that controls playback of the summary, wherein the playback control further includes an interface that accepts requests for additional data from the user, and wherein the playback control downloads and displays the additional data to the user in response to the requests.

Alternatively, the apparatus may include a cloud server, a security system that protects a secured area, a database of the security system, an activity analysis processor of the security system that monitors activities of the security system and a human operator of the security system based upon entries within the database of the security system, that evaluates the monitored activities based upon the entries, that evaluates a criticality of the monitored activities, that averages the monitored activities, including any deviation, trend or pattern, that detects events within the monitored activities, and that saves a summary of the events to the cloud server, wherein the summary includes one or more of video, image, text, audio, charts, and graphs relating to protection of the secured area, and a user interface of the cloud server that detects a request from a user for a report of the monitored activities occurring within a real time timeline window and downloads the report of the monitored activities to the user, wherein the report of the monitored activities includes at least a content of the summary of the events associated with the secured area and one or more of data, actions, warnings, help requests, and recommendations generated by the security system or the human operator, and wherein the cloud server updates an internal database of the cloud server in real time based upon posts from the activity analysis processor or the human operator.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention clamed is:

1. A method comprising:
   a security system monitoring a plurality of sensors and, upon detecting a first event associated with a first sensor in the plurality of sensors, saving a summary of the first event into an event file;
   the security system tracking and storing a record of actions taken by any of a plurality of human operators in response to each of a plurality of events in the event file;
   an activity analysis processor monitoring and evaluating activities of the security system and the plurality of human operators via changes to the event file;
   the activity analysis processor detecting at least one of the plurality of events within the activities and saving, as a post, a summary of the at least one of the plurality of events to a cloud server;
   the cloud server updating an internal database in real time based upon the post from the activity analysis processor;
   a user interface of the cloud server detecting a request from a user for an activity report of the activities reported within a real time timeline window;
   generating a list and identifiers of alarms occurring within the real time timeline window;
   including the list and the identifiers of the alarms occurring within the real time timeline window in the activity report;
   identifying a respective one of the plurality of human operators that responded to each of the alarms on the list;
   including an indication of the respective one of the human operators that responded to each of the alarms on the list in the activity report; and
   the cloud server downloading the activity report to the user.

2. The method as in claim 1 further comprising attaching a video clip to the activity report.

3. The method as in claim 1 further comprising including trouble indicators within the activity report.

4. The method as in claim 1 further comprising:
   generating a trend indicator defined by a number of the alarms per time period; and
   including the trend indicator in the activity report.

5. The method as in claim 1 further comprising including comments of the plurality of human operators in the activity report.

6. An apparatus comprising:
   a security system that monitors a plurality of sensors that, upon detecting a first event associated with a first sensor in the plurality of sensors, saves a summary of the first event into an event file and that tracks and stores a record of actions taken by any of a plurality of human operators in response to each of a plurality of events in the event file;
   a cloud server;
   an activity analysis processor that monitors and evaluates activities of the security system and the plurality of human operators via changes to the event file, that detects at least one of the plurality of events within the activities, and that saves a summary of the at least one of the plurality of events to the cloud server in real time;
   a user interface of the cloud server that detects a request from a user for an activity report of the activities reported within a real time timeline window; and
   an interface processor of the cloud server that generates a list and identifiers of alarms occurring within the real time timeline window, that includes the list and the identifiers of the alarms occurring within the real time timeline window in the activity report, that identifies a respective one of the plurality of human operators that responded to each of the alarms on the list, that includes an indication of the respective one of the plurality of human operators that responded to each of the alarms on the list in the activity report, and that downloads the activity report to the user.

7. The apparatus as in claim 6 wherein the activity report includes the summary of the at least one of the plurality of events and a playback control mechanism on the user interface for controlling playback of the summary of the at least one of the plurality of events.

8. The apparatus as in claim 7 wherein the playback control mechanism includes a timeline interface for receiving, from the user, a starting time and an ending time of the real time timeline window.

9. The apparatus as in claim 7 wherein the activity report includes a video clip or additional data identified through the user interface.

10. The apparatus as in claim 9 wherein the playback control mechanism includes a video interface for controlling the playback of the video clip based upon inputs from the user.

11. An apparatus comprising:
    a cloud server;
    a security system that protects a secured area;
    a database of the security system;

a first processor of the security system that monitors a plurality of sensors and that, upon detecting a first event associated with a first sensor in the plurality of sensors, saves, as a first post, a summary of the first event into an event file;

a second processor of the security system that tracks and stores a record of actions taken by any of a plurality of human operators in response to each of a plurality of events in the event file;

an activity analysis processor of the security system that monitors and evaluates activities of the security system and the plurality of human operators via changes to the event file, that detects at least one of the plurality of events within the activities, and that saves a summary of the at least one of the plurality of events to the cloud server in real time; and a user interface of the cloud server that detects a first request from a user for an activity report of the activities occurring within a real time timeline window and that downloads the activity report to the user, wherein the activity report includes a list of alarms reported by the security system within the real time timeline window and an indication of a respective one of the plurality of human operators that responded to each of the alarms on the list.

12. The apparatus as in claim 11 further comprising an interface processor of the cloud server that downloads the activity report to the user.

13. The apparatus as in claim 12 wherein the activity report includes the summary of the at least one of the plurality of events and a playback control mechanism on the user interface for controlling playback of the summary of the at least one of the plurality of events.

14. The apparatus as in claim 13 wherein the playback control mechanism includes a first interface for receiving a second request for additional data from the user, wherein the interface processor downloads the additional data responsive to the second request, wherein the playback control mechanism displays the additional data, and wherein the playback control mechanism includes a second interface for receiving user input to bookmark the additional data.

15. The apparatus as in claim 11 wherein the activity report includes a trouble message generated by the security system or a warning request in response to the alarms flooding the security system.

16. The apparatus as in claim 11 wherein the activity report includes a help request from any of the plurality of human operators.

17. The apparatus as in claim 11 wherein the user interface automatically populates a set of posts in real time to a terminal or a workstation of an assigned one of the plurality of human operators, without receiving a user request, based upon the assigned one of the plurality of human operators logging into the terminal or the workstation, and wherein the user interface populates the activity report with the set of posts related to an area or a zone assigned or related to a user profile associated with the assigned one of the plurality of human operators.

* * * * *